April 24, 1928.
H. W. TROUT
COTTON TREATING APPARATUS
Filed May 13, 1926  2 Sheets-Sheet 2
1,667,177
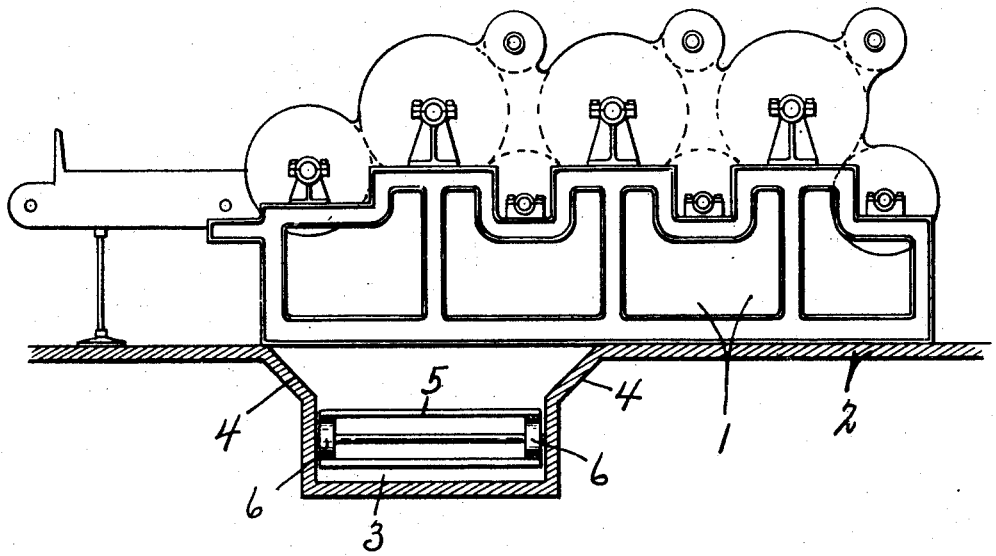
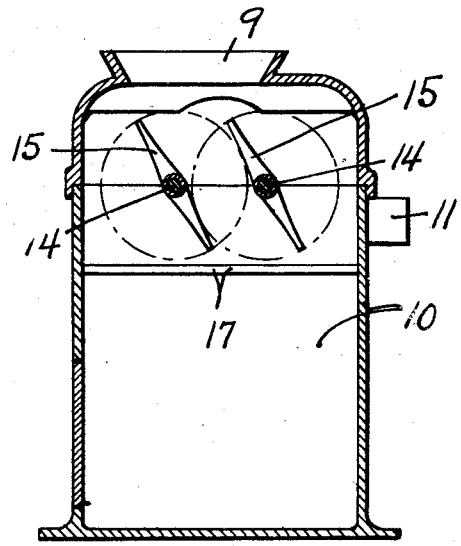
WITNESS
INVENTOR
Harry W. Trout
BY
ATTORNEYS Patented Apr. 24, 1928.

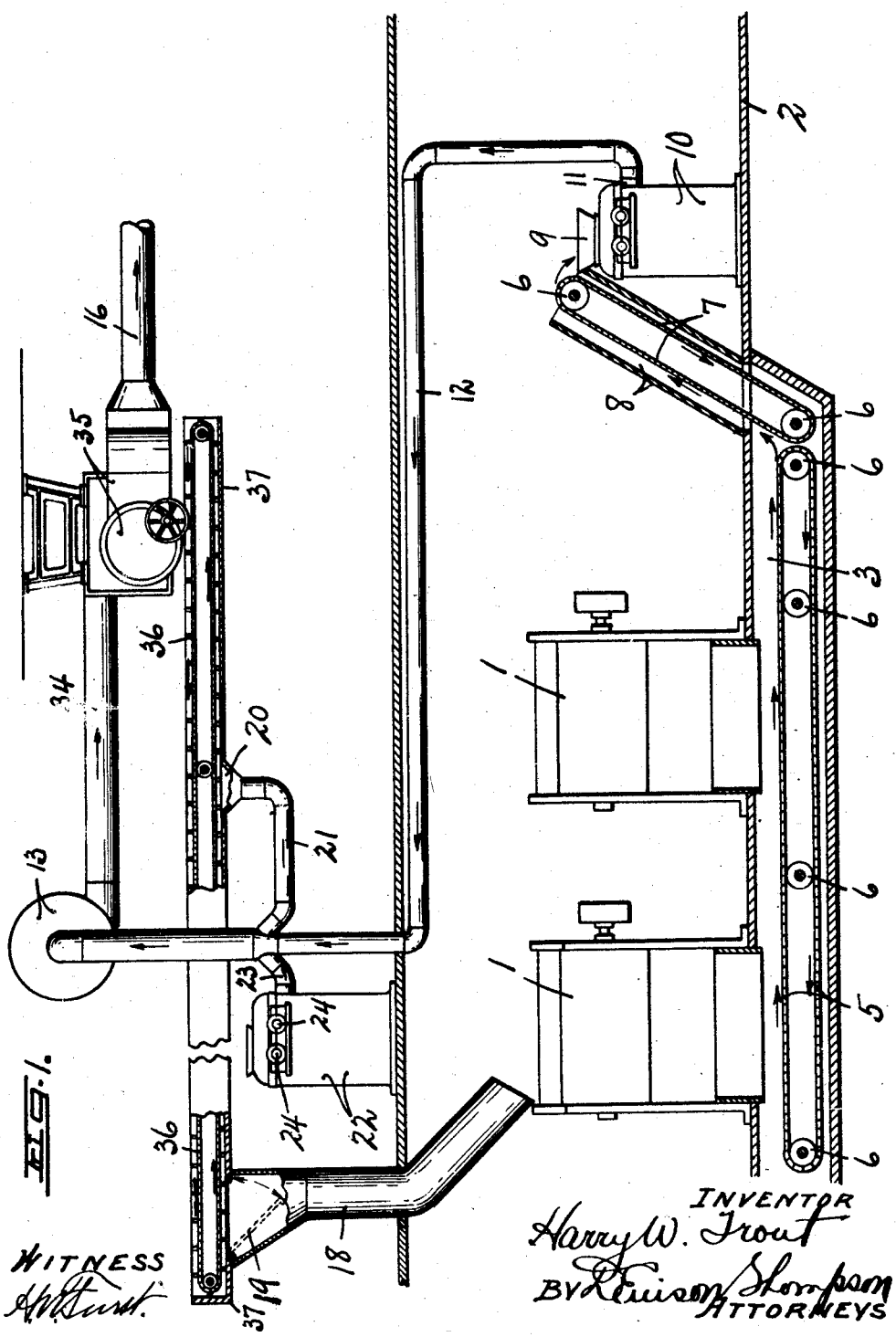

1,667,177

UNITED STATES PATENT OFFICE.

HARRY W. TROUT, OF SYRACUSE, NEW YORK, ASSIGNOR TO COTSWOLD COMFORTABLE COMPANY, OF SYRACUSE, NEW YORK, A CORPORATION OF NEW YORK.

COTTON-TREATING APPARATUS.

Application filed May 13, 1926. Serial No. 108,793.

This invention relates to certain new and useful improvements in cotton treating apparatus.

The function of a Garnett machine being to receive raw cotton and form it into layers of various thicknesses as desired, and thereafter roll it on drums, there is a considerable amount of waste cotton during the process, and it is very desirable to reclaim this waste cotton easily and economically.

The main object of the invention is to effect an economy in the use of such apparatus by recovering the waste from Garnett machines, and conveying and separating the same from foreign matter, and resupplying the separated cotton to the Garnett machines in a simple, automatic and efficient manner.

Other objects and advantages relate to the particular construction and arrangement of the apparatus and the details of the structure thereof, all as will more fully appear from the following description taken in connection with the accompanying drawings, in which:

Figure 1 is an elevation partially in section of an apparatus of this invention.

Figure 2 is an elevation partially in section of a Garnett machine arranged in connection with one of the features of this invention.

Figure 3 is a lateral vertical section through one of the separators.

The apparatus as illustrated in Figure 1 is shown as arranged upon two floors of a building. Such an arrangement is obviously unnecessary, as the particular position of the respective elements is not essential. A plurality of Garnett machines 1 are arranged in a row and heretofore considerable cotton has collected underneath the machines and become commingled with dirt and foreign matter, and when collected by hand was substantially a waste product.

In the apparatus of this invention, the floor or supporting means —2— for the Garnett machine is formed with a trough or channel —3— which may have inclined upper walls —4—, if desired, so that the cotton falling from the Garnett machine is collected in the trough. This trough or channel extends laterally under all of the Garnett machines arranged in the row and within the trough there is positioned a conveyor, in this particular illustration in the form of a belt conveyor —5— mounted on suitable rollers —6— and driven in any suitable manner not necessary to further illustrate or describe. These rollers may be journaled in opposite walls of the channel or trough, as indicated.

The belt conveyor —5— picks up the waste cotton and foreign matter and carries it along to the inclined conveyor, —7— which may be in the form of a belt conveyor mounted upon similar rollers —6— and contained within a housing 8. The conveyor 7 discharges the cotton and foreign matter into the upper open funneled end —9— of the separator —10—. This separator is in the form of a chamber closed except for the inlet —9— and an air outlet 11 at one side, the air outlet being connected by pipe 12 to a source of suction as the fan —13—.

The separator —10— includes beneath the inlet 9 a pair of longitudinally extending rotary shafts —14—, each carrying a plurality of cooperating beaters or fingers —15—, which intersect each other in their movement and act to break up the supplied cotton and foreign substance into small particles, whereupon the heavier foreign material drops through the grating —17— and collects in the bottom of the separator, while the lighter separated cotton is drawn out through the outlet —11— into pipe 12 and thence to the fan —13— and is ejected from the fan through pipe —34— into a condenser —35— of well known form, where again the cotton while upon the exterior of a perforated cylinder, is subjected to suction produced within the cylinder by any suitable mechanism such as a fan (not shown) and connected to the pipe —16—. The separated cotton drops from the condenser —15— onto the conveyor —36— and is carried along through the housing —37— and upon return movement is supplied to one or more chutes 18 adapted to discharge into the hopper of the Garnett machine or machines. Communication between housing 37 and each chute 18 is valve-controlled and such valves may be actuated in any suitable manner for supplying the desired quantity of cotton to a particular Garnett machine, and in some cases it happens that these valves 19 are closed and the cotton would be conveyed back again to the end of the housing adjacent the condenser 15, and in order to prevent this near the condenser 15 the housing 37 is formed with an opening 20 leading to pipe 21 which is in communication with the pipe 12 leading to the fan 13 so that any cotton which is not supplied to one of the chutes leading to the Garnett machines is drawn through opening 20 and pipe 21 into the pipe 12, and thence to the fan 13 which again supplies this cotton to the condenser 35 from which it falls upon the conveyor 36.

In addition there is provided a second separator numbered 22 which is designed for use in connection with cotton as it comes from the bale, and this separator is of a construction similar to the separator 10 and has an outlet in communication with pipe 23 leading to the pipe 12 thence to the fan 13. This separator in like manner includes rotary shafts 24 containing carrying fingers or beaters identical with the beaters 15.

It will be apparent that with this construction, the waste cotton is automatically recovered and supplied again to the Garnett machines in a comparatively simple and efficient manner and that the fan 13 acts to convey all of the cotton from the separators and also the unused cotton from below the conveyor 36 to the condenser 35 and thence to the upper side of the conveyor 36.

For the purpose of economizing in space, there is here illustrated but two Garnett machines and one chute 18, but it will be obvious that there will be one chute for each Garnett machine and that any number of Garnett machines may be utilized in a single row, or in additional rows so long as the supporting floor or element is formed with a trough or channel beneath the machines in which the waste material collects and from which it is conveyed automatically to a separator, the cotton being taken from the separator by suction of the fan which supplies the main body of cotton to the condenser 35 from whence it is delivered to the Garnett machines, and altho I have shown a specific construction and arrangement of the parts of the apparatus, I do not desire to restrict myself to the details of the same, as various changes may be made within the scope of the appended claims.

I claim:

1. An apparatus for recovering from and supplying cotton to Garnett machines comprising in combination with a plurality of Garnett machines, of a continuous channel extending under all of said machines, means in said channel for conveying cotton escaping from the Garnett machines, a separator for receiving the recovered cotton from said conveying means, mechanical means in the separator for breaking up the cotton, a fan connected to the separator for producing a suction therein and for withdrawing the separated cotton from the separator and mechanism for receiving the cotton from the fan and re-supplying it to the Garnett machine.

2. An apparatus for recovering from and supplying cotton to Garnett machines comprising in combination with a plurality of Garnett machines, of a continuous channel extending under all of said machines, means in said channel for conveying cotton escaping from the Garnett machines, a separator for receiving the recovered cotton from said conveying means, means in the separator for breaking up the cotton said means comprising a plurality of rotating blades having intercepting paths of movement, a fan connected to the separator for producing a suction therein and for withdrawing the separated cotton from the separator, and mechanism for receiving the cotton from the fan and re-supplying it to the Garnett machine, a second separator, and means for connecting said separator to the fan whereby additional cotton is supplied to said mechanism.

3. An apparatus for recovering from and supplying cotton to Garnett machines comprising in combination with a plurality of Garnett machines, of a continuous channel extending under all of said machines, means in said channel for conveying cotton escaping from the Garnett machines, a separator for receiving the recovered cotton from said conveying means, means in the separator for breaking up the cotton said means comprising a plurality of rotary shafts, each of said shafts carrying a plurality of cooperating blades, a fan connected to the separator for producing a suction therein, and for withdrawing the separated cotton from the separator, and mechanism for receiving the cotton from the fan and resupplying it to the Garnett machine, said mechanism including a housing, chutes leading from the housing to respective Garnett machines, and a conveyor in the housing.

4. An apparatus for recovering from and supplying cotton to Garnett machines comprising in combination with a plurality of Garnett machines, of a continuous channel extending under all of said machines, means in said channel for conveying cotton escaping from the Garnett machines, a separator for receiving the recovered cotton from said conveying means, means in the separator for breaking up the cotton, said means comprising a plurality of rotary shafts, each shaft carrying a plurality of blades so disposed that the path of movement of one set of blades intercepts the path of movement of the other set of blades, a fan connected to the separator for producing a suction therein, and for withdrawing the separated cotton from the separator, mechanism for receiving the cotton from the fan and resupplying it to the Garnett machine, said mechanism including a housing, chutes leading from the housing to respective Garnett machines, and a conveyor in the housing, valves controlling communication between the housing and the chutes and said housing having an additional opening adapted to receive cotton after it has passed by all of said chutes leading to Garnett machines, and means for connecting said opening to the said fan whereby the return cotton is re-supplied to the conveying mechanism.

In witness whereof I have hereunto set my hand this 10th day of May 1926.

HARRY W. TROUT.